US006338503B1

(12) United States Patent
Hollander

(10) Patent No.: US 6,338,503 B1
(45) Date of Patent: Jan. 15, 2002

(54) PROMOTIONAL DISPLAY STRUCTURE AND METHOD

(75) Inventor: Milton Bernard Hollander, Stamford, CT (US)

(73) Assignee: Omega Engineering, Inc., Stamford, CT (US)

( * ) Notice: Subject to any disclaimer, the term of this patent is extended or adjusted under 35 U.S.C. 154(b) by 0 days.

(21) Appl. No.: 09/263,458

(22) Filed: Mar. 5, 1999

Related U.S. Application Data

(63) Continuation-in-part of application No. 08/740,604, filed on Oct. 31, 1996, now Pat. No. 5,890,741.

(51) Int. Cl.[7] ............................ B42D 1/00; G03B 25/00

(52) U.S. Cl. ............................ 283/62; 283/51; 283/61; 283/56; 283/67; 283/70; 281/221; 273/269; 352/50; 352/51; 352/52

(58) Field of Search .............................. 283/56, 51, 67, 283/70, 61, 62; 281/221; 273/269; 352/52, 50, 51

(56) References Cited

U.S. PATENT DOCUMENTS

| | | | | | |
|---|---|---|---|---|---|
| 964,967 | A | * | 7/1910 | Hallam | 283/70 |
| 1,374,501 | A | * | 4/1921 | Greig | 283/62 |
| 3,829,132 | A | * | 8/1974 | Willieme | 281/31 |
| 4,509,759 | A | * | 4/1985 | Small | 273/269 |
| 4,512,595 | A | * | 4/1985 | Breen | 283/70 |
| 4,971,362 | A | * | 11/1990 | Lapsker | 283/58 |
| 5,199,924 | A | * | 4/1993 | Fitzgibbons | 462/26 |
| 5,547,225 | A | * | 8/1996 | DeAngelis | 281/211 |
| 6,000,722 | A | * | 12/1999 | Werner et al. | 281/29 |

* cited by examiner

*Primary Examiner*—Willmon Fridie, Jr.
*Assistant Examiner*—Mark T. Henderson
(74) *Attorney, Agent, or Firm*—William A. Drucker

(57) ABSTRACT

A promotional display structure has a plurality of elongate strips of stiff but bendable material assembled in a pack with their obverse and reverse faces alternating in the pack, the first face having textual display including promotional matter and in some cases also cartoon matter, the second face having illustrative cartoon matter and in some cases also promotional matter, the pages of the pack being releasably connected at one end of their elongation, for example by gumming or other form of binding, and being readily detachable by hand from the remainder of the pack. One or more lines of weakness may be formed in the strips, for example by perforation or crimping, to facilitate folding of a part of the strip against the remainder of the strip, and a releasable fastening may be provided to retain that part in the folded condition. There are also provided a method of forming the promotional display structure, and a method of disassembly thereof.

1 Claim, 3 Drawing Sheets

PROMOTIONAL DISPLAY STRUCTURE AND METHOD

RELATED APPLICATION

This application is a continuation in part of my application Ser. No. 08/740,604 filed Oct. 31, 1996 now U.S. Pat. No. 5,890,741, the entire contents of which are incorporated herein by reference.

FIELD OF THE INVENTION

The present invention relates generally to promotional, advertising, cataloguing and like material, and more particularly to such material, which has incorporated in it graphic and/or verbal, content adapted to arouse and sustain the interest of a recipient.

OBJECTS OF THE INVENTION

It is accordingly the primary object of the present invention to provide a promotional display structure which displays both promotional material and also "interest sustaining" material, as described in detail herein, for the purpose of seeking to maintain the promotional material within the field of view and attention of the recipient.

It is another object of the invention to provide such a promotional display structure which can be readily manufactured in a bulk form and which permits individual portions of display structure to be readily separated for use.

It is another object of the invention to provide such a display structure which is adapted, in its whole or part form, to be sent through the mails.

It is a still further object of the invention to provide a promotional display structure, which has a series of panels showing "cartoon" type illustrations, with or without accompanying verbal material.

It is a still further object of the invention to provide methods of assembly, and of dis-assembly, of the display structure.

BRIEF DESCRIPTION OF THE DRAWINGS

The foregoing and still other objects and advantages of the present invention will be apparent from the detailed explanation of preferred embodiments thereof shown in the accompanying drawings, wherein.

DESCRIPTION OF THE PREFERRED EMBODIMENTS

Figure 1:
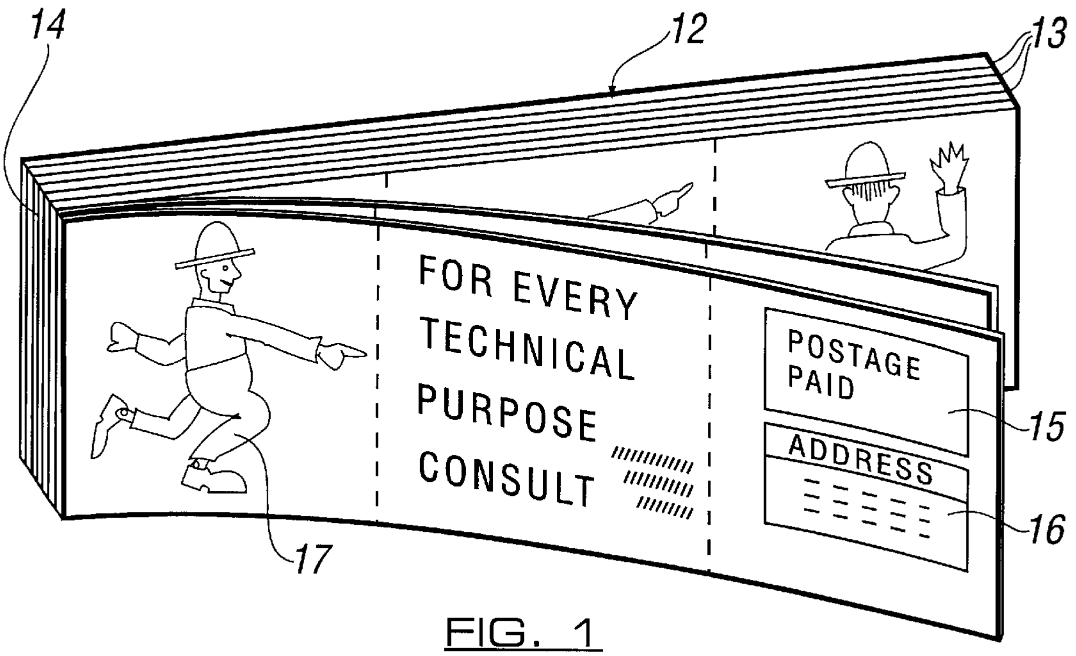
FIG. 1 is a perspective view of an embodiment of the invention having a number of sheets of relatively stiff material which are bound at one edge to provide a book-like appearance.
Figure 2:
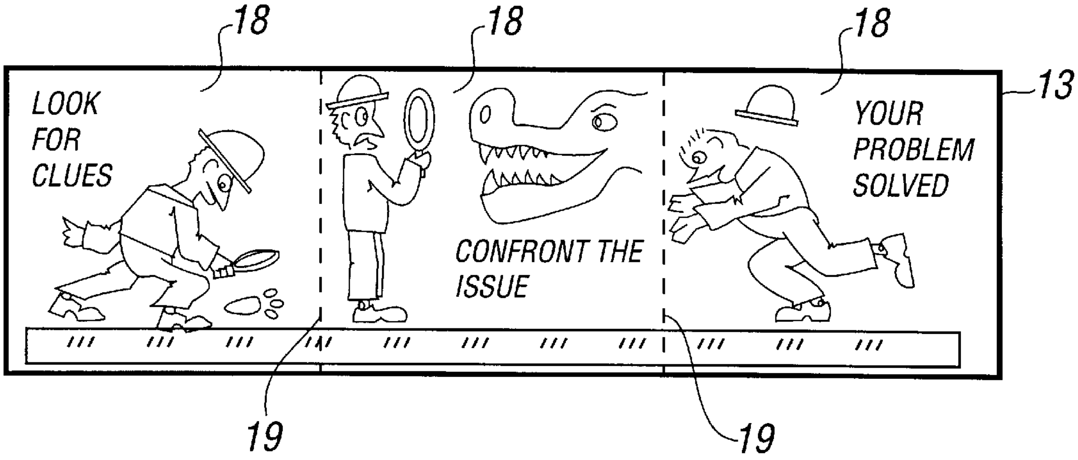
FIG. 2 is a plan view of the reverse face of a representative one of the sheets of the structure shown in FIG. 1.

Referring to FIGS. 1 and 2 of the drawings there is shown an embodiment wherein a book-like structure 12 comprises a relatively large number, say 50 or 100, sheets 13 bound at one end in any convenient manner, say as by gumming as shown at 14. Two of the sheets 13 are shown bent somewhat outwardly more readily to disclose the nature of the "pack" of sheets.

On the front face of each sheet 13, as seen in FIG. 1, there is various printed material such as a postal stamp area 15, a postal address area 16, and a representative cartoon FIG. 17 which gives an indication of the nature of the other cartoon subject matter to be found on the inside of the sheets of the book. The individual sheets 13 are made of a relatively stiff but bendable, or even foldable, card or heavy paper material. Each sheet 13 of the pack of sheets has, on its "inner" face, as seen in FIG. 2, a plurality of areas 18, which contain drawings, and/or textual material of a cartoon subject matter. Each of the sheets 13 has, on its reverse face, a different type of such cartoon material, or further examples of a single type. The cartoon material of each such sheet would be complete in itself, e.g. an illustrated story line. Further, at a base or other edge position on the reverse face there is provided additional information, such as for example how to contact the purveyor of the book of sheets and any other commercial information desirable. Although reference has been made above to only a single edge as being bound, in another embodiment more than one edge is bound, as by adhesive or in any other manner which permits relatively easy bending away and removal of the individual sheets. Each of the sheets 13 is in a further embodiment provided with one or more lines 19 indicating a point at which the sheet may conveniently be bent up, e.g. folded back on itself, and in a further embodiment such lines 19 are weakened, e.g. perforated to facilitate bending.

Figure 3:
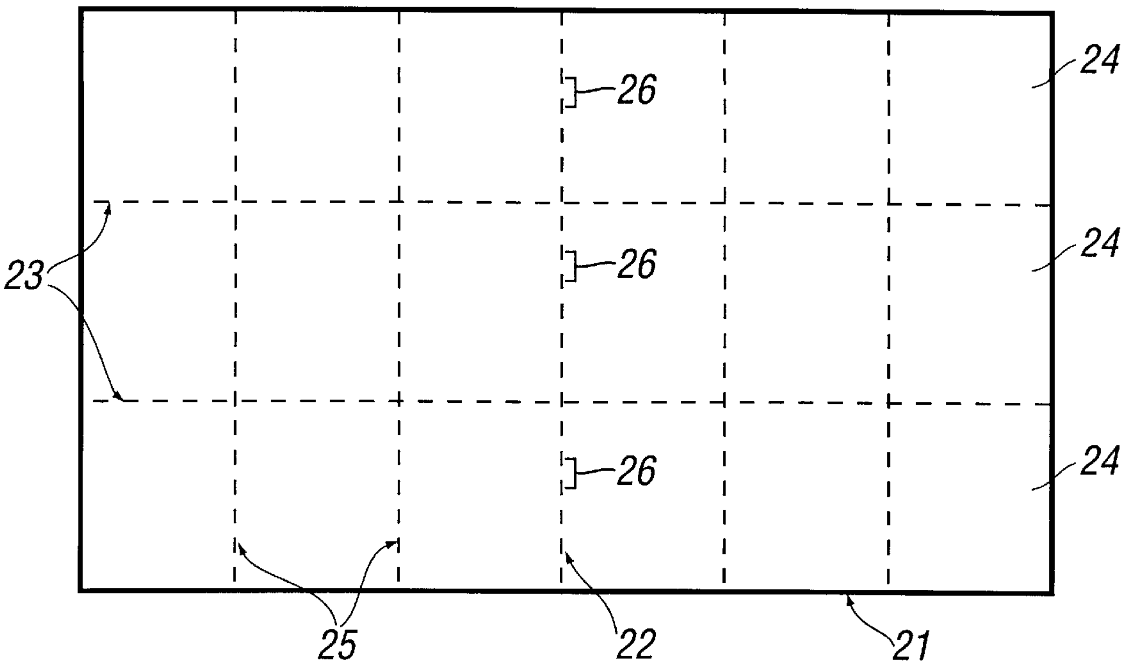
FIG. 3 is a plan view of a second embodiment having a sheet of card material as seen in a first stage of preparation of a plurality of the display structures of the invention.
Figure 4:
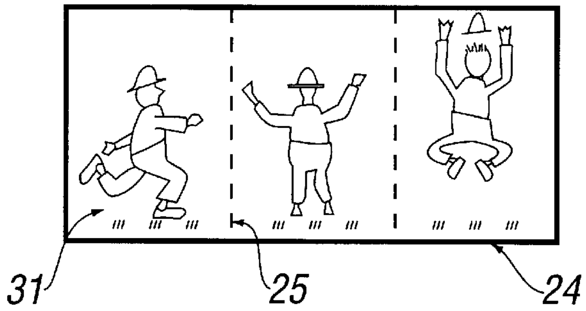
FIG. 4 is a plan view of a single portion of the card material of the embodiment of FIG. 3 prior to folding it into the completed display structure.

Referring to FIG. 3 of the drawing, a sheet 21 is made of a suitably stiff card or heavy paper material which in one embodiment is in a single piece, or in another embodiment is in two portions gummed or otherwise releasably connected, e.g. as by tape or other binding, at a vertical center line 22.

In a preferred form, the center line 22 has a line of perforations, or weakenings, and the sheet 21 as a whole can be folded once about that line to provide a more manageable sheet size, e.g. for storage purposes. The sheet 21 is also perforated, or otherwise weakened, along two horizontal lines 23, so as to define in the sheet 21 a set of three horizontal strips 24. In another embodiment, the sheet 21 is cut, as by scissors for example, along the lines 23. The sheet 21 is further perforated, or otherwise weakened, along a plurality of vertical lines 25, for a purpose which is explained later herein.

If it is desired to provide the sheet 21 as a multi-layer sheet, or again if it is desired to connect two or more of the sheets 21 temporarily together, e.g. for storage, handling, or mailing purposes, then in a further embodiment the center line 22 has staples 26 or other fastening means thereon. Where on sheet 21, or a plurality of sheets 21, are folded about the center line 22, a form analogous to a book results.

The drawing shows the sheet 21 as being divided into a set of six strips 24, but it will be appreciated that, in other embodiments, a number greater than three could be used.

The face of the sheet 21 visible in FIG. 3 has, on each horizontal strip 24, a series of illustrations with or without accompanying wording and other graphic material which may be termed "cartoon" illustrations. By way of example, in a further embodiment there are provided three or more episodes of a cartoon character such as the well-known DILBERT. Each set of graphic material of a strip 24, is unique and complete in itself.

Figure 5:
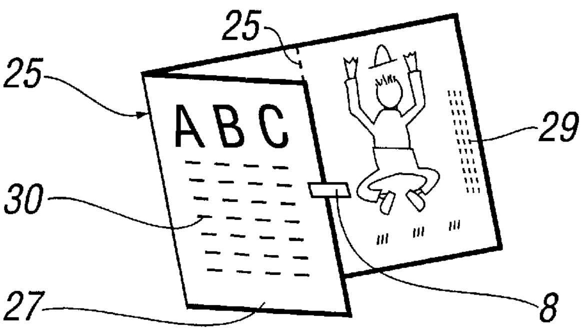
FIG. 5 is a perspective view of the display structure of the embodiment of FIG. 3 in the course of folding it into its substantially flat final form.

On the obverse of the sheet 21 there is printed or otherwise provided some advertising and/or technical and/or catalogue type promotional material. Referring to FIG. 5, one end portion 27 of the strip 24 has been folded forwardly, about a line 25, so that when the portion 27 is pressed flat against the rest of the strip 24, the advertising or other material is displayed to view.

In a further embodiment, provision is made to retain to the end portion 27 in the flat position, e.g. for storage, handling, or mailing purposes, and for example a small tongue 8 of readily releasable adhesive paper or the like is provided at one edge.

As the individual strips 24 are each of a relatively stiff material, the strips lend themselves to being pinned upon a notice board or advertising hoarding or other show mounting.

It is known that the U.S. Post Office will accept for mailing a single-fold card item, as shown in FIG. 5, and accordingly in another embodiment a mailing address 29 is printed or embossed at a free edge of the strip 24.

A distributor wishing to utilise the invention for the purposes of publicity and promotion of his goods, and at the same time to ensure that there will be a continued interest maintained in the promotional material, provides the promotional material 30 (FIG. 5) on the one face, and cartoon 31 or other "interest" material on the other face. As a result the cartoon or other interest material will tend to be noted and retained, e.g. by pinning it up on a notice board, so that at the same time the promotional material is kept in the field of view of staff or customers.

A user of the invention would keep a stock of the sheets 21, as seen in FIG. 3, in flat or folded condition, and at the time of distribution, e.g. by mailing, would tear or cut off the strips 34.

Figure 6:
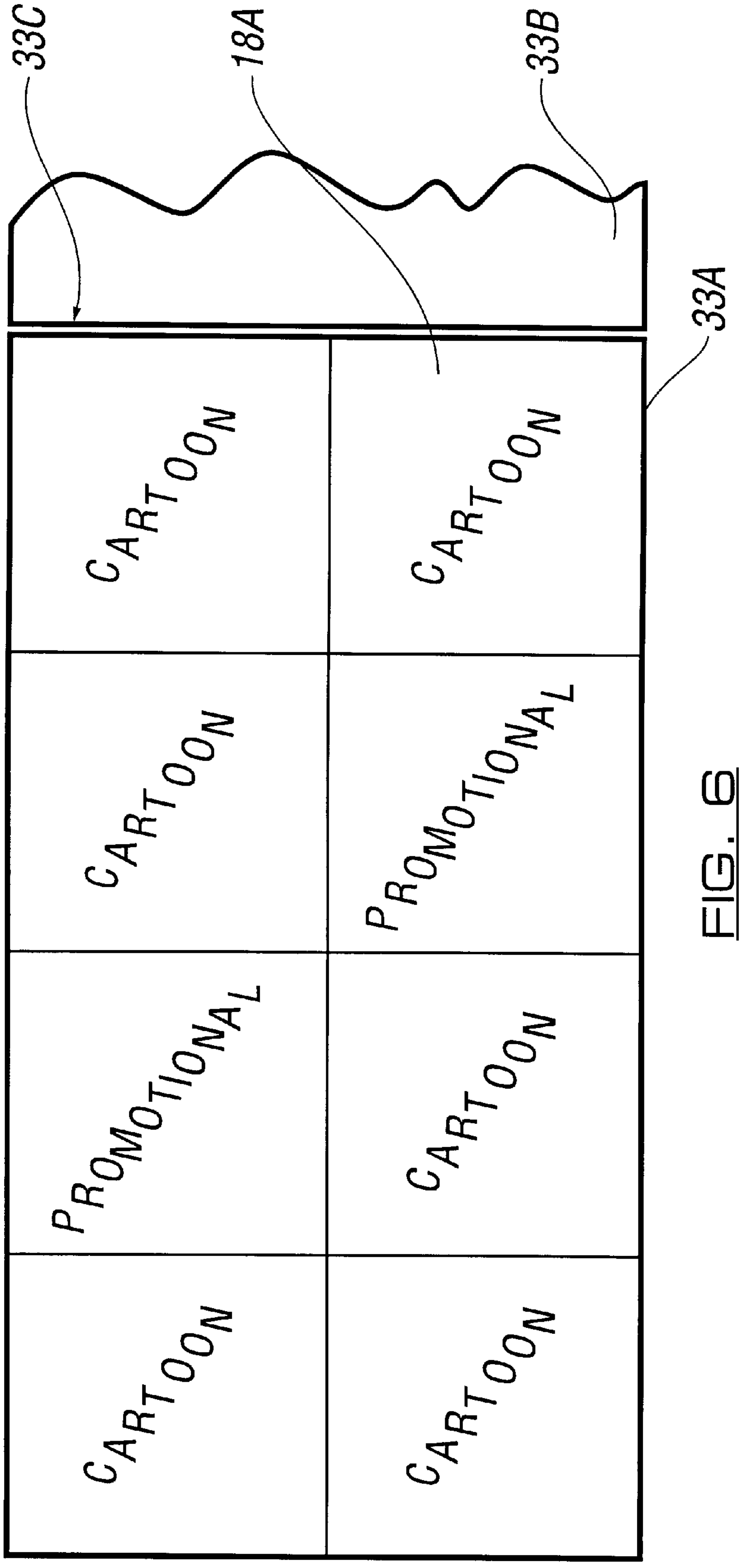
FIG. 6 is an elevation of the reverse face of a representative sheet of doubled vertical dimension.

Referring now to FIG. 6 of the drawings, there are shown the faces of two representative sheets 33A, 33B, hinged at 33C, of twice the vertical dimension so that the reverse or rear face of sheet 33A provides a total of eight areas 18A in which would be placed items of cartoon material in some areas and promotional material in other areas, and the upper and lower rows of areas could have different arrangements of the different types of areas, as shown.

In all of the cases described above, in a further embodiment the sheets are provided each with one of a series of cartoon pictures which, when the entire book is "riffled", give an illusion of movement of the cartoon characters.

The invention further provides a method of forming the promotional display structure including steps of:

(i) providing elongated strips of a relatively stiff but bendable sheet material to constitute pages;

(ii) providing on a first face of each such strip textual display including at least promotional material;

(iii) providing on the second face of each such strip at least some illustrative material of the nature of a cartoon;

(iv) connecting a plurality of said strips, in a readily releasable manner, at one edge of the elongation, to form a multi-page booklet from which individual pages can be removed by hand without disturbing the remainder.

The invention further provides a method, of disassembly of a promotional display structure having a plurality of elongated strips of a relatively stiff but bendable sheet material constituting pages, said strips being connected in readily releasable manner at one end edge of their elongation, said method including a step of removing individual strips one by one from said display structure.

The invention further provides an additional step, after removal of each strip, of folding back, on the remainder of the strip, of an end portion of the strip. In a further step, said folded back end portion is fastened releasably to the remainder of the strip.

What is claimed is:

1. In a book comprising multiple bound pages of paper sheet material, each page having two horizontal short edges and two vertical long edges, all said pages being bound along one vertical edge to provide a book-like appearance for a pack of pages, the improvements in which: said pages have printed on a face nine cartoon panels arranged in three horizontal rows; and in which each row of three panels forms a sequential story line relating to interests of readers; each page of non-cartoon panels is adapted to be hand separated from the binding of the pack along a line of weakness for collection and for individual display or mounting; and alternating pages of said book contain said cartoon panels and the obverse sides of said pages display promotional text of sales displays, to form a book catalogue of products and text interleaved with cartoon pages.

* * * * *